(12) United States Patent
Robins et al.

(10) Patent No.: US 7,122,232 B2
(45) Date of Patent: Oct. 17, 2006

(54) EXPANDABLE PRINT MEDIUM

(75) Inventors: Mark Nelson Robins, Greeley, CO (US); Heather Noel Bean, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/170,244

(22) Filed: Jun. 11, 2002

(65) Prior Publication Data
US 2003/0228449 A1    Dec. 11, 2003

(51) Int. Cl.
 B41M 5/40    (2006.01)
 B41M 5/00    (2006.01)
 B32B 3/12    (2006.01)
(52) U.S. Cl. ............... 428/32.63; 428/32.18; 428/32.24; 428/178; 428/182
(58) Field of Classification Search ........ 428/120, 428/166, 178, 182, 188, 32.18, 32.24, 32.63
See application file for complete search history.

(56) References Cited

U.S. PATENT DOCUMENTS

| | | | |
|---|---|---|---|
| 4,410,316 A | 10/1983 | Yoke | |
| 4,931,342 A | 6/1990 | Tolbert et al. | |
| 4,993,846 A * | 2/1991 | Diamond et al. | ........... 383/127 |
| 5,306,100 A * | 4/1994 | Higginbotham | ............. 410/154 |
| 5,379,945 A | 1/1995 | Kataoka | |
| 5,413,824 A | 5/1995 | Van Erden | |
| 5,498,080 A * | 3/1996 | Dalea et al. | ................ 383/120 |
| 5,795,425 A | 8/1998 | Brault et al. | |
| 5,824,396 A | 10/1998 | Missell | |
| 6,139,938 A | 10/2000 | Lingle et al. | |
| 6,338,891 B1 | 1/2002 | Kawasaki et al. | |
| 6,627,296 B1 * | 9/2003 | Tudela et al. | ............... 428/182 |
| 2002/0012778 A1 | 1/2002 | Nakamura | |
| 2002/0025407 A1 | 2/2002 | Luna et al. | |

* cited by examiner

Primary Examiner—Donald J. Loney

(57) ABSTRACT

A print medium that is expandable and collapsible comprises two sheets separated by at least one collapsible brace. The collapsible brace includes a first wall attached to one of the sheets and a second wall that swings in relation to the first wall. The swinging motion of the second wall in one direction expands a distance between the two sheets, while a swinging motion of the second wall in the opposite direction collapses the distance between the two sheets. At least one sheet of the paper may include an ink receiving layer. When the collapsible brace is expanded, the print medium becomes a substantially rigid structure.

20 Claims, 9 Drawing Sheets

EXPANDABLE PRINT MEDIUM

FIELD OF THE INVENTION

The present invention relates to the field of paper products and more particularly relates to print media for use in printers and copiers. More specifically, the invention relates to print media that is thin enough to pass through a printer when in a collapsed state and which may be subsequently expanded to a form a rigid structure.

BACKGROUND OF THE INVENTION

Technological advances in computer printer technologies have made computer printers less expensive and thus, widely available to all computer users. Currently available printers are able to produce full-color and highly detailed images. Digital cameras have also become widespread and are often used in place of conventional cameras due to their versatility and functionality. For example, images obtained with digital cameras are easily downloadable to a computer where a user is able to collect and manipulate the various images and print them out using the high quality printers of today.

The images and documents created on the printers are often printed on a printing medium, such as a piece of paper. However, standard printer paper is typically non-rigid. To make the printed information more sturdy and suitable for visual display, the printed paper is usually attached to a backing or other rigid support structure. However, attaching the printed paper to the backing is time consuming and requires use of additional materials.

One such type of backing that is used is construction paper. Construction paper is typically a thick, rigid paper of varying colors that is often used in the craft industry. Another type of backing that may be used to make a print medium rigid is corrugated paperboard or cardboard. Cardboard is typically made with three layers of paper stock, where a middle corrugated layer is sandwiched between two flat paper layers. The middle layer is corrugated by forming the middle layer in a pattern of alternating ridges and grooves, with the peaks and troughs of the ridges and grooves being attached to the interior surfaces of the two flat paper layers, typically with an adhesive.

In addition to making the printed information rigid, the backing may be bent or folded into various shapes for the creation of decorative objects. Possible uses for the backings include forming a curved media in the shape of a rigid cylinder for displaying advertisements on a restaurant table, incorporating the backing into various craft projects or figures to produce decorations for holidays and parties, or making protective and insulating gift packages. However, since printers and copiers are limited to the thickness of printing medium that the printer or copier may accept for printing, passage of a cardboard or construction paper backing through the printer may be problematic since most printers require a print medium having a caliper thickness of 0.040 inches or less.

U.S. Pat. No. 6,139,938 to Lingle et al. discloses a printable, corrugated paperboard. The paperboard in Lingle et al. is constructed from three layers of paper having a middle corrugated layer that is sandwiched between two outside layers. The paperboard has a combined thickness of less than 0.042 inches allowing the paperboard to pass through a printer. However, the corrugated layer in the paperboard of Lingle et al. is glued to the outside layers, has a set thickness, is not expandable to a greater thickness and is not collapsible.

In view of the foregoing, there is a need in the art for a paper or printer medium that is thin enough in a collapsed state to have an image disposed thereon and pass through a typical printer, and which may be subsequently transformed to a rigid, sturdy structure for use in creating objects displaying the information printed on the paper or printer medium.

BRIEF SUMMARY OF THE INVENTION

In accordance with the invention, an expandable print medium and method for providing the same are disclosed. An expandable print medium including at least one collapsible brace disposed between two planar sheets is disclosed. The expandable print media provides a surface that is substantially flat for printing images and data thereon and which can be subsequently expanded to provide a rigid medium for display.

The invention also includes an expandable piece of print medium having a collapsible corrugated layer disposed between a substrate and an ink-receiving layer. The print medium also includes a filament attached to the corrugated middle layer. The expandable print medium, when in a collapsed state, may be received by a printer or copier such that an image or other data may be printed on the ink-receiving layer. The print medium may be subsequently expanded to a rigid form for subsequently displaying the image or other data.

BRIEF DESCRIPTION OF THE DRAWINGS

While the specification concludes with claims particularly pointing out and distinctly claiming that which is regarded as the present invention, the advantages of this invention can be more readily ascertained from the following description of preferred embodiments of the invention when read in conjunction with the accompanying drawings in which:

DETAILED DESCRIPTION OF THE INVENTION

The invention described herein is directed to an expandable and collapsible print medium for use with inkjet printers, laser printers, dye-sublimation printers, photocopiers, and other devices that transmit images and other data to a print medium. More specifically, a print medium having an expandable, collapsible core, which in a collapsed state is accepted by a printer and in an expanded state is rigid and planar, is disclosed. The expandable print medium enables the user to print an image or document on the print medium and then expand the print medium, making it more rigid or shaped, and suitable for display.

Figure 1:
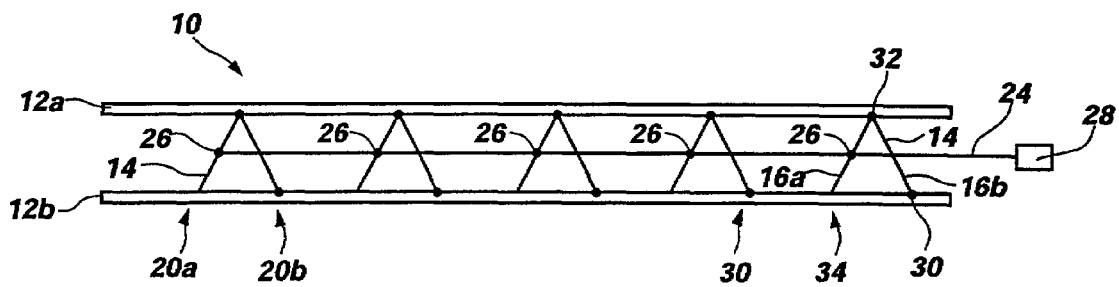
FIG. 1 represents a cross sectional view of an expandable piece of paper in accordance with the present invention.

It will be apparent from the following description that the figures described herein are not drawn to scale, but are rather illustrated for exemplary purposes only. Referring to FIG. 1, there is shown a cross sectional view of a piece of an expandable and collapsible print medium, such as print paper 10 (hereinafter "expandable medium 10") in an expanded state. As illustrated, the expandable medium 10 includes an upper sheet 12a and a lower sheet 12b, wherein the sheets are substantially planar members. The sheets 12 described herein may be any type of paper substrate known to those of ordinary skill in the art including, without limitation, polyester films, resin-coated papers, or other coated papers known to those of ordinary skill in the art. The paper substrate may include, but is not limited to, one or more natural pulps, regenerated pulps, or synthetic pulps. The paper substrates may also contain additives generally used for paper making, such as sizing agents, strengthening agents, loading materials, antistatic agents, fluorescent brighteners, and dyes. Furthermore, one or more surfaces of the sheets 12 may be coated with surface sizing agents, surface strengthening agents, fluorescent brighteners, antistatic agents, dyes, anchoring agents, and the like.

The expandable medium 10 also includes a plurality of collapsible internal braces 14 (hereinafter "collapsible braces") which have a general "V" shape. As described herein, each collapsible brace 14 may represent a single flute of a corrugated middle layer of the expandable medium 10. The plurality of collapsible braces 14 function as a corrugated medium within the expandable medium 10 to provide strength and rigidity to the expandable medium 10 when the collapsible braces 14 are expanded. It will be apparent that the plurality of collapsible braces 14 illustrated in FIG. 1 are used to produce a corrugated paper in an expanded state and are collapsible to produce a substantially flat piece of paper.

Figure 2A:
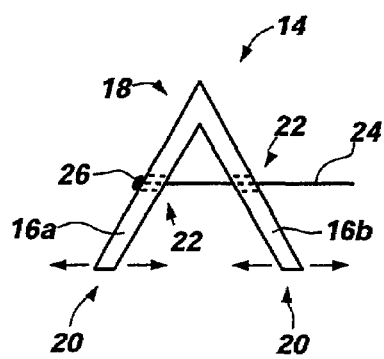
FIG. 2A represents a cross sectional view of a collapsible brace.
Figure 2B:
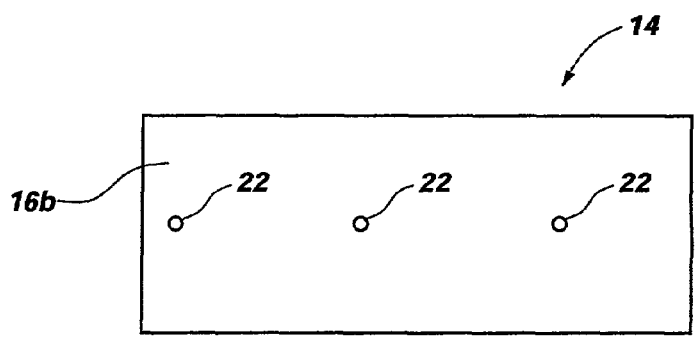
FIG. 2B represents a front view of the collapsible brace of FIG. 2A.
Figure 2C:
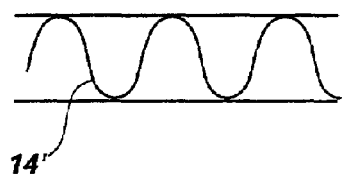
FIG. 2C and FIG. 2D represent alternative embodiments of the collapsible brace of the present invention.
Figure 2D:
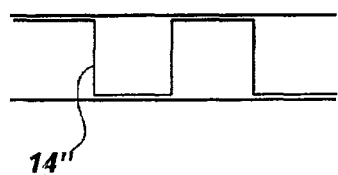

An exploded cross-sectional view of the collapsible brace 14 of FIG. 1 is illustrated in FIG. 2A. As shown in FIG. 2A, the collapsible brace 14 is a single piece with two walls 16 that meet at a hinge region or flexible joint 18. Each wall 16 of the collapsible brace 14 has a hole 22 formed therein, wherein an axis of each of the two holes 22 in wall 16a and wall 16b are substantially coaxial to each other. The two walls 16 may pivot at the hinge region 18 where ends 20 of the walls 16 may swing closer together or swing farther apart. Referring now to FIG. 2B, there is shown a front view of the collapsible brace 14 of FIG. 2A. The view in FIG. 2B illustrates an outside face of wall 16b. As illustrated, three holes 22 are formed in the wall 16b at substantially the same vertical height, but it is apparent that any number of holes 22 may be formed therein. Although the collapsible braces 14 have been described herein as individual braces with a general "V" shape, collapsible braces 14 with other shapes that perform identical or equivalent function to the "V" shaped braces are meant to be encompassed by the present invention. For example, in FIGS. 2C and 2D there is shown a "U" shaped collapsible brace 14' and an "L" shaped collapsible brace 14", respectively, that may be used in alternative embodiments. It will also be appreciated that although the collapsible braces 14 in FIG. 1 are individual, as depicted in FIGS. 2C and 2D the collapsible braces 14 of the present invention may also be linked together.

Referring again to FIG. 1, the expandable medium 10 also includes a filament 24. As illustrated, the filament 24 is substantially parallel to the upper sheet 12a and the lower sheet 12b. As shown in FIG. 2A, the filament 24 extends through the holes 22 in the walls 16 of the collapsible braces 14 and is attached to one of the walls 16a of each collapsible brace 14 by an attachment means 26. Attachment of the filament 24 to one of the walls 16 of the collapsible brace 14 may be accomplished in any manner known to those of ordinary skill in the art including, but not limited to, using an adhesive, tying a knot in the filament 24, or attaching the filament 24 to a member that is larger than the hole 22 (FIG. 2A).

As illustrated in FIG. 1, the filament 24 extends beyond the upper sheet 12a and the lower sheet 12b and is securely attached to the pull tab 28, such that the pull tab 28 may be used to pull the filament 24. The filament 24 is attached to each of the collapsible braces 14 on the wall 16a lying distal to the pull tab 28, while the filament 24 passes through the wall 16b that is proximate the pull tab 28. A top 32 of the collapsible brace 14 is attached to the upper sheet 12a by a securing means 30. A bottom of the wall 16b proximate to the pull tab 28 is also attached to the lower sheet 12b by the securing means 30. In the illustrated embodiment, the securing means 30 is an adhesive that adheres the collapsible brace 14 to the upper sheet 12a or lower sheet 12b. It is understood that any manner of securing the collapsible brace 14 to the lower sheet 12b or the upper sheet 12a may be used to practice the present invention.

The distal wall 16a of the collapsible brace 14 also contacts the lower sheet 12b at top 34, but is not secured to the lower sheet 12b at top 34 allowing the collapsible brace 14 to slide along the lower sheet 12b at top 34. Although the upper sheet 12a in the illustrated embodiment is attached to the collapsible brace 14, in alternative embodiments, the upper sheet 12a may not be attached to the collapsible brace 14, but rather the top 32 of the collapsible brace 14 that contacts the upper sheet 12a may slide along the upper sheet 12a.

Figure 3:
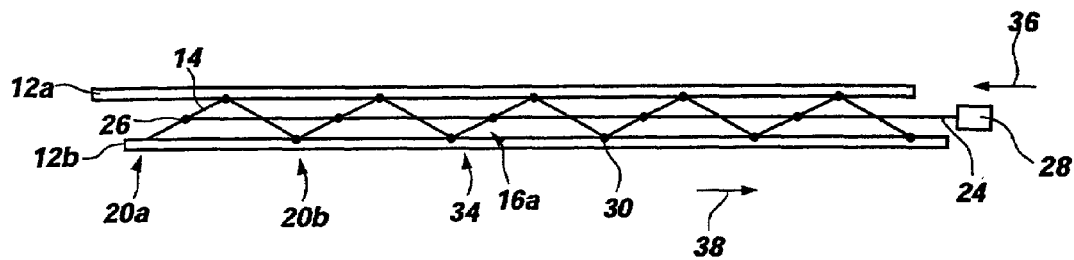
FIG. 3 and FIG. 4 represent cross sectional views of a partially collapsed and substantially collapsed expandable piece of paper of FIG. 1, respectively.

Referring to FIG. 3, the expandable medium 10 of FIG. 1 is shown in a partially collapsed state. As illustrated, the upper sheet 12a and the lower sheet 12b are in closer proximity to one another than the upper sheet 12a and the lower sheet 12b of FIG. 1. Also, the ends 20 of the collapsible brace 14 are farther apart from one another than the ends 20 illustrated in FIG. 1. The ends 20a of the walls 16a that are positioned distal to the pull tab 28 move in relation to the ends 20a of the walls 16b that are positioned proximate to the pull tab 28 and which are attached to the lower sheet 12b with the securing means 30. Since the filament 24 is attached to the collapsible braces 14, the collapsing of the collapsible braces 14 causes the filament 24 to move in the direction of arrow 36. Upon collapsing the upper sheet 12a and the end 20a of the distal wall 16a of the collapsible brace 14 also move in the direction of the arrow 36 as the expandable medium 10 collapses.

Figure 4:
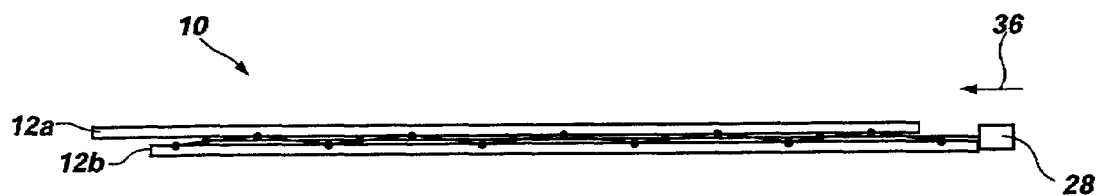

Referring now to FIG. 4, there is shown a cross section of the expandable medium 10 of FIG. 1 in a substantially collapsed portion. As illustrated, the upper sheet 12a has moved as the expandable medium 10 has collapsed in the direction of the arrow 36, such that the upper sheet 12a partially hangs over the lower sheet 12b. The expandable medium 10 of FIG. 4 has a smaller thickness than the non-collapsed expandable medium 10 of FIG. 1. As illustrated, the collapsed expandable medium 10 is thin enough to be received in a computer printer or photocopy machine.

In the illustrated embodiment, the upper sheet 12a may comprise an ink receiving layer for receiving dry ink or wet ink from the computer printer or photocopy machine. As known to those of ordinary skill in the art, ink-receiving layers may be fabricated by coating or adhering at least one or more ink-receiving layers to the paper substrate, such that the paper substrate is configured to receive dry or wet ink. As known to those of ordinary skill in the art, ink receiving layers are designed to accept an image or other indicia with clear color tone such that no change in color tone occurs on the printed portions of the ink receiving layer and such that no discoloration (e.g. yellowing) occurs on the unprinted portions of the ink-receiving layer after a lapse of time. As illustrated, the upper sheet 12a comprises an ink jet recording sheet and the lower sheet 12b comprises a paper liner that is not specially coated to be an ink-receiving layer. However, it is within the scope of the present invention to have both the upper sheet 12a and the lower sheet 12b include ink-receiving layers or to have both the upper sheet 12a and the lower sheet 12b comprise paper liners.

In the collapsed state, the expandable medium 10 may be received by the computer printer or photocopier and have an image or other text printed on the ink-receiving layer. Once printing has finished, the expandable medium 10 may be expanded to make the expandable medium 10 rigid. As illustrated in FIG. 3, the expandable medium 10 is expanded by pulling the tab 28 away from the expandable medium 10. This action causes the attachment means 26 to engage and lift the distal wall 16a of the collapsible brace 14. As the collapsible brace 14 is lifted, the upper sheet 12a moves farther away from the lower sheet 12b and the expandable medium 10 returns to the expanded state as shown in FIG. 1. In the illustrated embodiment, the collapsible brace 14 comprises a paper substrate, but it is understood that any material that may be collapsed and expanded as the collapsible brace 14 described herein can be used.

Figure 5:
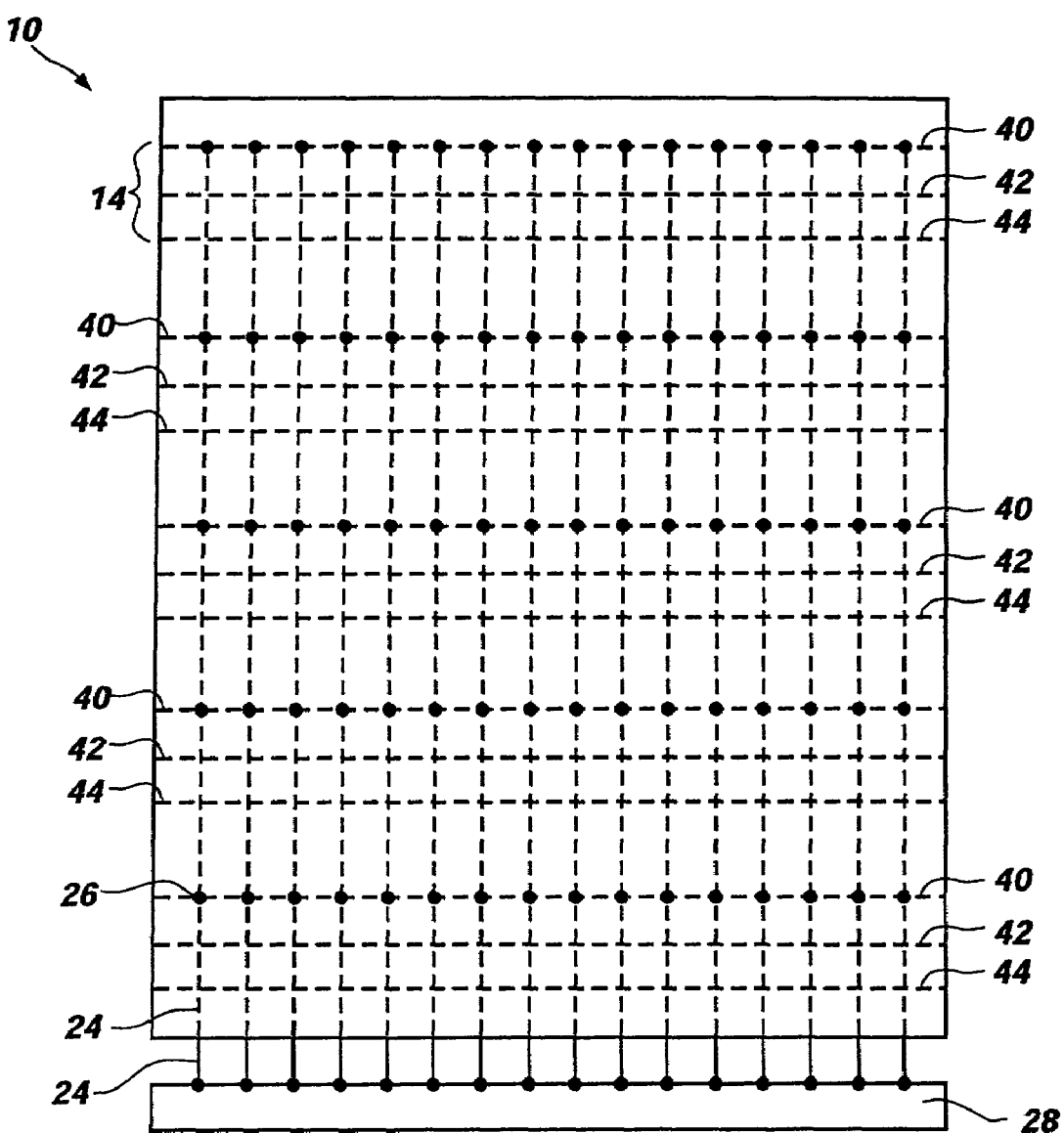
FIG. 5 represents a top view of the expandable piece of paper of FIG. 1.

Referring now to FIG. 5, there is shown a top view of the expandable medium 10 of FIG. 1, wherein the collapsible braces 14 substantially extend across the expandable medium 10 in a transverse direction. Horizontal dashed lines 40 illustrate points of contact where the ends 20a of the distal walls 16a of each of the collapsible braces 14 contact the lower sheet 12b (shown in FIG. 1). Horizontal dashed lines 42 illustrate points of contact where the top 32 of each collapsible brace 14 contacts the upper sheet 12a (shown in FIG. 1) and horizontal dashed lines 44 illustrate points of contact where the ends 20b of the proximate walls 16b of each of the collapsible braces 14 contact the lower sheet 12b (shown in FIG. 1). The filaments 24 are shown as vertical dashed lines and extend out of the expandable medium 10 to the pull tab 28. It will be apparent that the collapsible braces 14 may also be positioned longitudinally along a length of the expandable medium 10 in an alternative embodiment.

Figure 6:
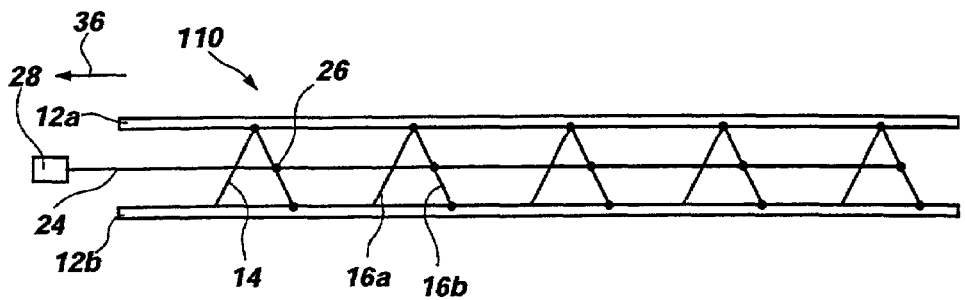
FIG. 6 and FIG. 7 represent an alternative embodiment of an expandable piece of paper of the present invention.
Figure 7:
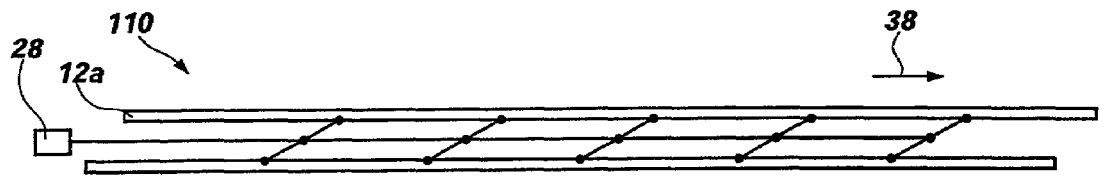

Referring now to FIG. 6, there is shown a cross section of an alternative embodiment of expandable medium 110. As illustrated, the expandable medium 110 in the alternative embodiment is substantially the same as the expandable medium 10 of FIG. 1, except that the attachment means 26 is located on the opposite wall 16b of the collapsible brace 14 and the pull tab 28 on the filament 24 is on the opposite side on the expandable medium 10 of FIG. 1. As shown in FIG. 7, the expandable medium 110 in this embodiment collapses when the upper sheet 12a moves in the direction indicated by arrow 38 and the walls 16 of the collapsible brace 14 collapse one on top of the other as illustrated in FIG. 7. After the expandable medium 110 has collapsed, the expandable medium 110 may be passed through a printer or copier such that an image may be printed on an ink-receiving layer on the upper sheet 12a or the lower sheet 12b. The expandable medium 110 may then be expanded by pulling the pull tab 28 in the direction indicated by arrow 36, wherein the collapsible braces 14 reverse the collapsing process to expand the expandable medium 110.

Figure 8:
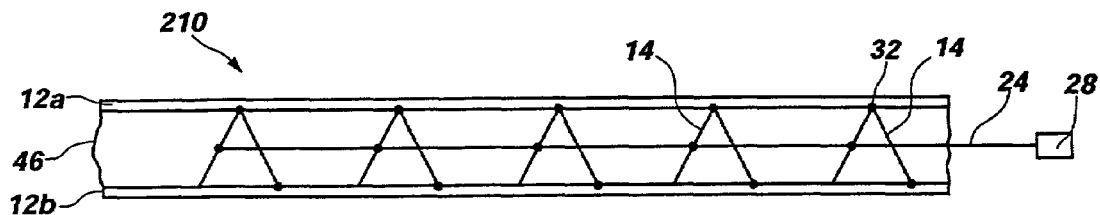
FIG. 8 and FIG. 9 represent another alternative embodiment of an expandable piece of paper.
Figure 9:
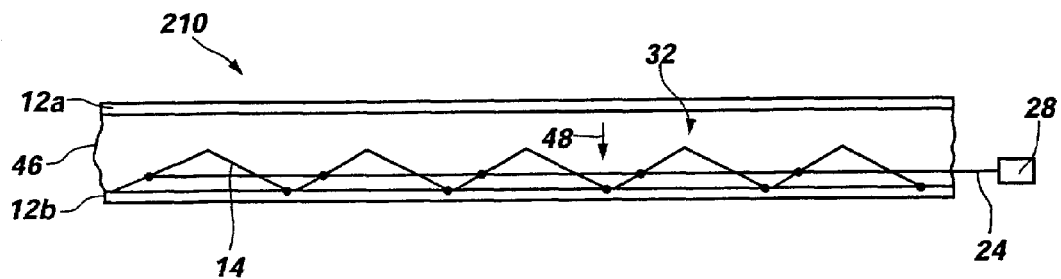

Referring now to FIG. 8, there is shown another alternative embodiment of the expandable medium 210. The expandable medium 210 of this embodiment is essentially the same embodiment as the expandable medium 10 of FIG. 1, except that the top 32 of the collapsible brace 14 is not attached to the upper layer 12a. The expandable medium 210 of FIG. 8 also has a compressible casing 46 attached to the upper sheet 12a and the lower sheet 12b, wherein the casing 46 is attached to the entire periphery of the upper sheet 12a and the lower sheet 12b. The casing 46 may be fabricated from an elastic material, to allow the casing 46 to stretch. As shown in FIG. 9, since the collapsible brace 14 is not attached to the upper sheet 12a, the collapsible braces 14 may collapse and prevent the upper sheet 12a from moving laterally. Rather, the upper sheet 12a will move straight downward as indicated by arrow 48 and rest on the top 32 of the collapsible brace 14. It will be apparent that the expandable medium 210 may be expanded by pulling the pull tab 28 away from the expandable medium 210.

Figure 10:
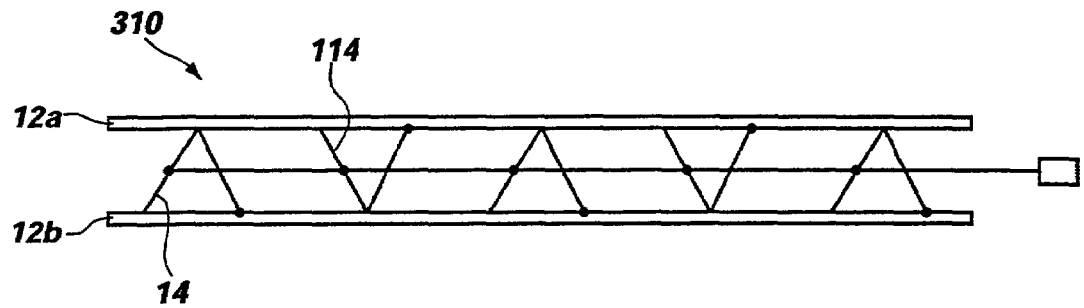
FIG. 10 and FIG. 11 represent an alternative embodiment of an expandable piece of paper with inverted collapsible braces.
Figure 11:
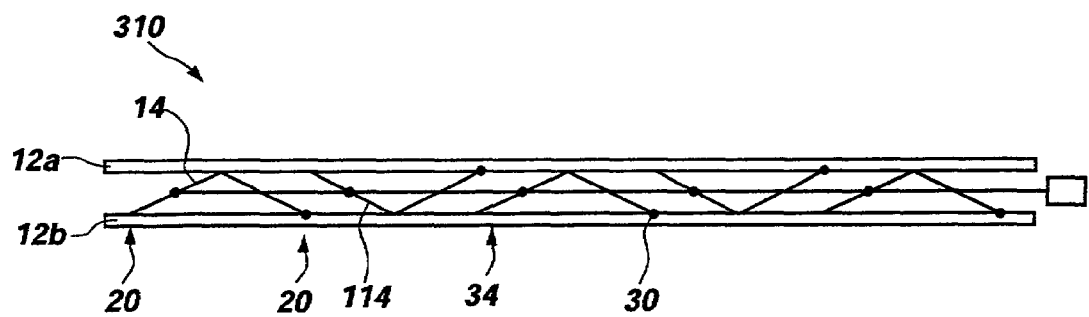

Referring now to FIG. 10, there is shown a cross section of another alternative embodiment of the expandable medium 310. In this embodiment, the expandable medium 310 has inverted collapsible braces 114 in addition to the collapsible braces 14. Combining the inverted collapsible braces 114 with the collapsible braces 14 may provide more support because the collapsible braces 14 and inverted collapsible braces 114 may be spaced closer together than the collapsible braces 14 alone. Referring now to FIG. 11, the expandable medium 310 of FIG. 10 is shown in a partially collapsed state, illustrating how the collapsible braces 14 and the inverted collapsible braces 114 will collapse relative to each other.

Figure 12:
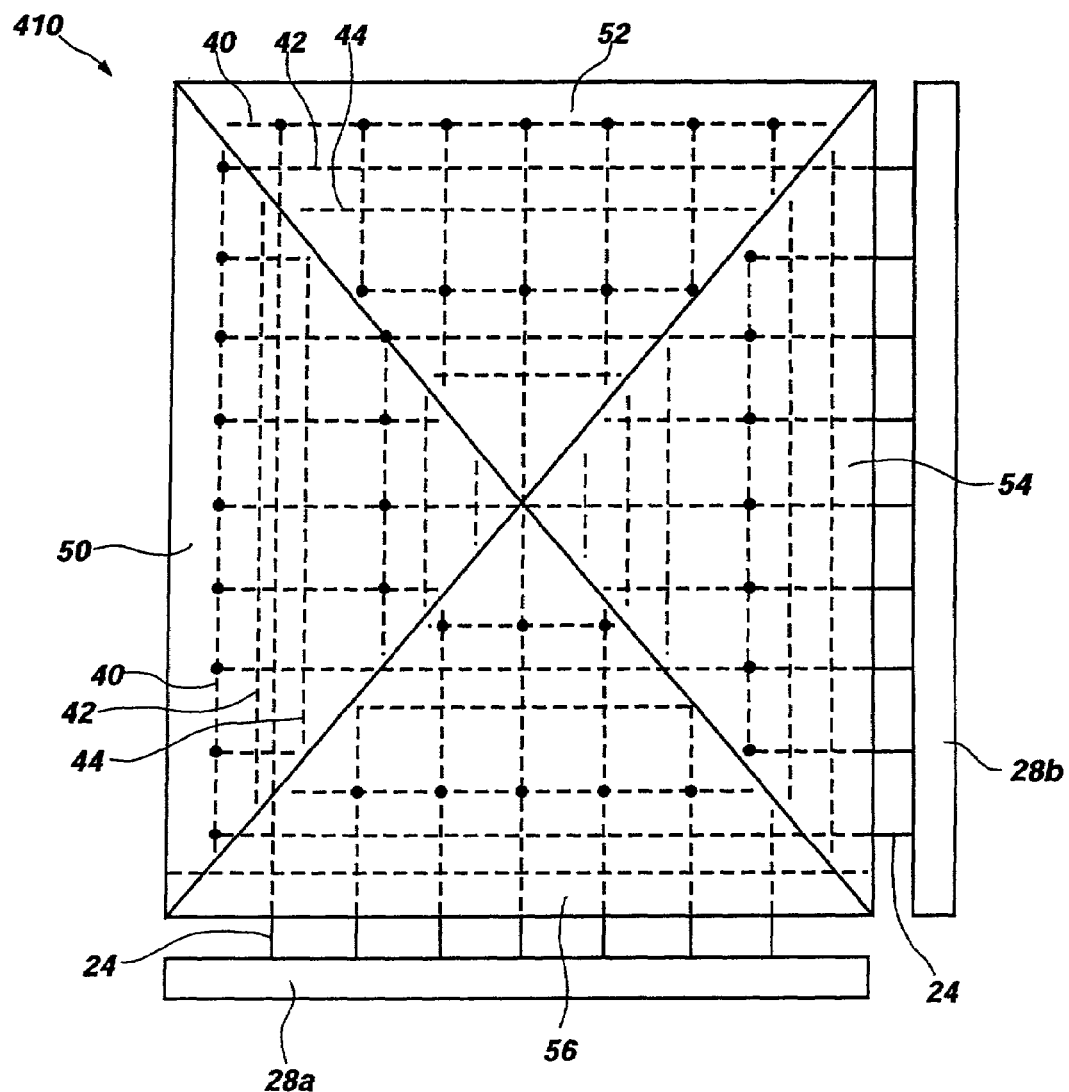
FIG. 12 represents another alternative embodiment of the expandable piece of paper of the present invention wherein the collapsible braces are disposed in multiple directions.

Referring now to FIG. 12, there is shown another alternative embodiment of the expandable medium 410. As illustrated, the collapsible braces 14 are positioned both transverse across the collapsible piece of expandable medium 410 and longitudinally along the expandable medium 410. FIG. 12 illustrates a top view of the expandable medium 410 divided into four quadrants 50, 52, 54, and 56. The collapsible braces 14 are illustrated in a similar manner to the collapsible braces 14 of FIG. 5, wherein three sets of horizontal dashed lines 40, 42, and 44 represent the points of contact between the collapsible braces 14, and the upper sheet 12a and the collapsible braces 14 and the lower sheet 12b. As shown in quadrants 52 and 56, the collapsible braces 14 extend transverse across the expandable medium 410 and narrow in length from an exterior periphery of the expandable medium 410 to the center of the expandable medium 410. In quadrants 50 and 54, the collapsible braces 14 extend longitudinally on the expandable medium 410 and diminish in length from the outer periphery of the expandable medium 410 to the center.

Figure 13:
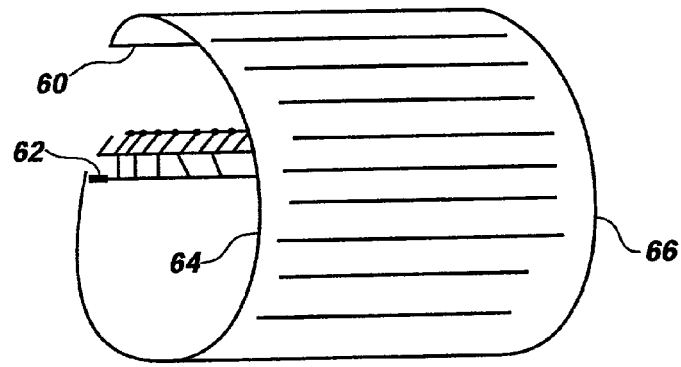
FIG. 13 represents a perspective view of a curled piece of expandable paper of FIG. 1.

To expand the expandable medium 410 of FIG. 12, two pull tabs 28a and 28b are used. The tab 28a pulls the filaments 24a attached to the transverse collapsible braces 14 in quadrants 52 and 56, while the tab 28b pulls the filaments 24b attached to the collapsible braces 14 in quadrants 50 and 54. Although not illustrated, the filaments 24a in quadrant 56 extend into and attach to the collapsible braces 14 in quadrant 52, and the filaments 24b in quadrant 54 extend into and attach to the collapsible braces 14 in quadrant 50, such that pull tabs 28a, 28b may be used to expand all the collapsible braces 14 of the expandable medium 410. It is understood that providing collapsible braces 14 in both a transverse and longitudinal orientation will provide rigidity to the expandable medium 410 in both the transversely and longitudinal directions. For example, FIG. 13 shows a perspective view of the expandable medium 10 of FIG. 5 partially rolled or curled. Since the expandable medium 10 of FIG. 5 has the collapsible braces 14 extending transverse, the expandable medium 10 is able to be rolled up, or curled, from end 60 to end 62. However, the expandable medium 10 of FIG. 12 would resist curling from side 64 to side 66 because the transverse collapsible braces 14 would prevent curling from the side 64 to side 66.

Figure 14:
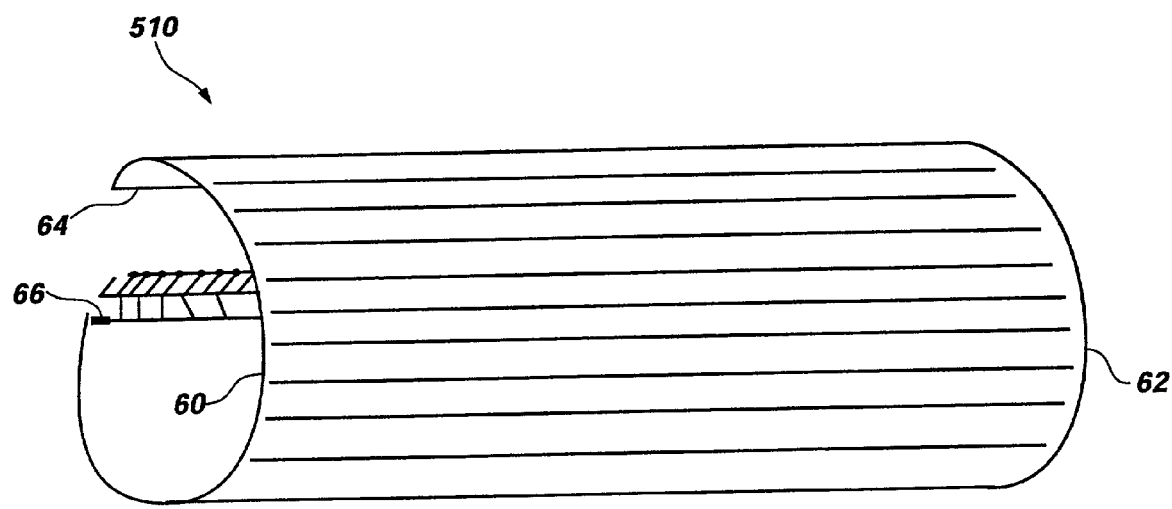
FIG. 14 represents a perspective view of an alternative embodiment of an expandable piece of paper of the present invention.

As illustrated in FIG. 14, there is shown a perspective view of a piece of expandable medium 510 with collapsible braces 14 extending longitudinally therealong. As illustrated, the expandable medium 510 is curled from side 64 to side 66 and would resist curling from end 60 to end 62 because of the longitudinally placed collapsible braces 14. Referring again to FIG. 12, the expandable medium 410 would resist curling in both a side to side and an end to end direction because the collapsible braces 14 extend in both transverse and longitudinal directions. It will be further appreciated, that the collapsible braces 14 may be placed longitudinally on one end of a piece of paper and transverse on an opposite end of the piece of paper such that the paper may be curled in different directions on the same piece of paper.

Figure 15:
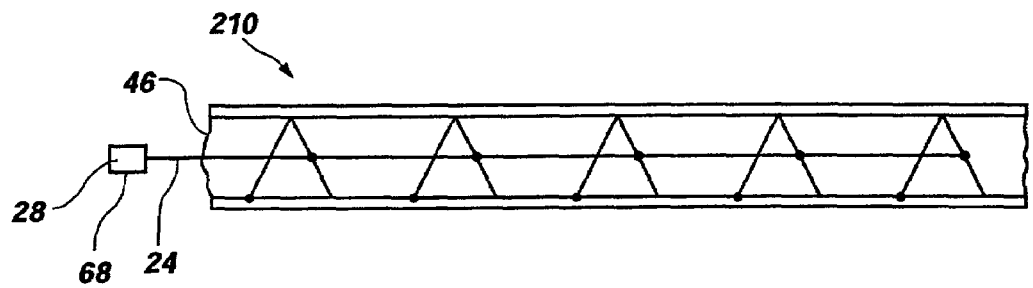
FIG. 15 and FIG. 16 illustrate how a pull tab of the present invention being used to secure the expandable piece of paper to an expanded form.
Figure 16:
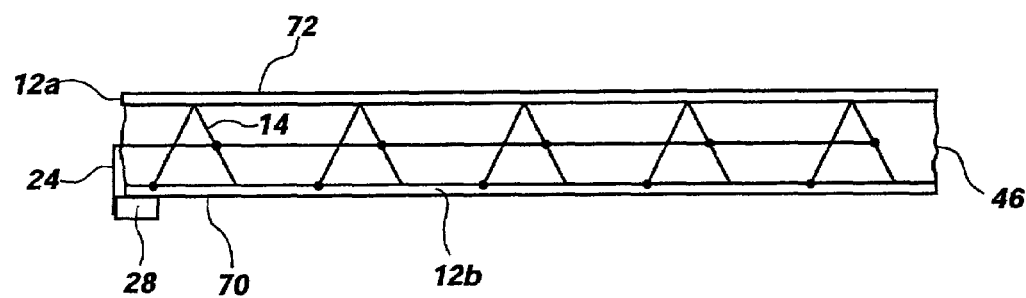

When the expandable paper in any of the embodiments described herein is in an expanded state, as shown in FIG. 15, the pull tab 28 may be used to secure the expandable medium 210 in the expanded state. As shown in FIG. 15, a lower surface 68 of the pull tab 28 may be coated with an adhesive such that the lower surface 68 of the pull tab 28 will adhere to a surface. FIG. 16 illustrates the pull tab 28 adhered to a lower surface 70 of the lower sheet 12b, such that the filaments 24 are secured and hold the collapsible braces 14 in the expanded position. Although the pull tab 28 is adhered to the lower surface 70 of the lower sheet 12b such that the pull tab 28 will not interfere with the aesthetic quality of a photo or other image printed on an upper surface 72 on the upper sheet 12a, it is apparent that the pull tab 28 may also be adhered to the upper surface 72 on the upper sheet 12a. The adhesive used to coat the lower surface 68 of the pull tab 28 may by of a type such that securing the pull tab 28 is permanent or, alternatively, the adhesive used may be semipermanent such that the expandable medium 210 may be expanded, secured with the pull tab 28. The pull tab 28 may then be unsecured, the expandable medium 210 may be collapsed, and the expand-collapse process may be repeated.

Figure 17:
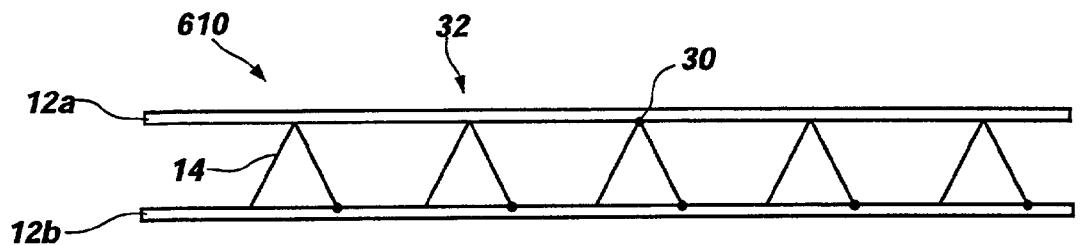
FIGS. 17 through 19 represent another alternative embodiment of an expandable printable paper of the present invention.

In yet another embodiment of the present invention, a piece of expandable medium 610 may be expanded or contracted without the use of the filament 24. As depicted in FIG. 17, the expandable medium 610 is substantially the same as the expandable medium 210 of FIG. 8 without the filament 24. The top 32 of the collapsible brace 14 may or may not be secured to the upper sheet 12a with the securing means 30. To expand or contract the expandable medium 610, a user may pull the upper sheet 12a in the direction of arrow 36 or the lower sheet 12b in the direction of arrow 38. As illustrated, the upper sheet 12a is pulled in the direction of the arrow 36, as represented in FIG. 18, to collapse the expandable medium 610.

Figure 18:
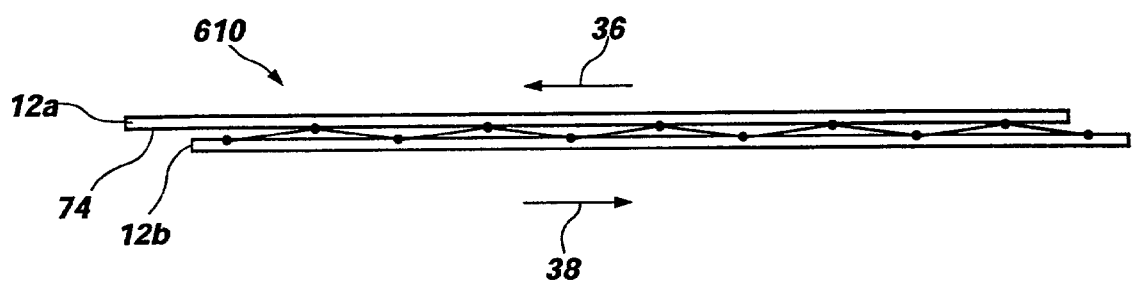
Figure 19:
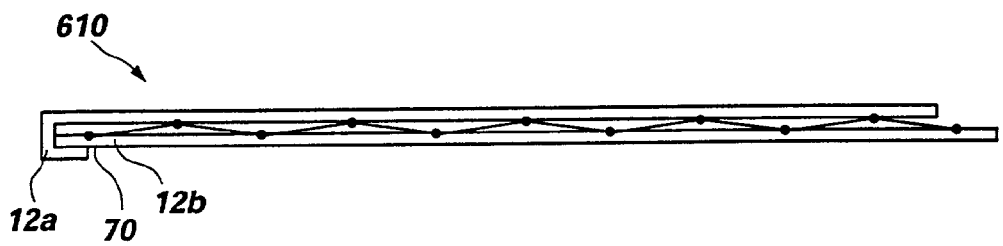

As illustrated in FIG. 18, a portion of the upper sheet 12a extends over the lower sheet 12b. To secure the expandable medium 610 in the collapsed position, a layer of adhesive may be placed on a lower surface 74 of the upper sheet 12a that extends over the lower surface 12a. The portion of the upper sheet 12a extending over the lower sheet 12b may then be wrapped around the lower sheet 12b and adhered to the lower surface 70 of the lower sheet 12b, as illustrated in FIG. 19. As previously described herein, the adhesive may be a permanent adhesive for permanent attachment or a semi-permanent adhesive such that the upper sheet 12a may be detached from the lower sheet 12b, and the expandable medium 610 may be expanded by reversing the process.

The expandable medium 10 of the present invention may be fabricated into papers of varying sizes including, without limitation, 8½×11, metric A4, 11×17, 8½14, or any other paper size known to those of ordinary skill in the art. Additionally, the expandable medium 10 of the present invention is not meant to be limited to papers used in printers and copiers. Furthermore, although the detailed description herein has been directed towards expandable medium 10 with approximately five collapsible braces 14, it will be appreciated that the expandable medium 10 described herein may be fabricated with any number of collapsible braces 14 and not depart from the spirit of the present invention. For instance, in a standard piece of printer paper, hundreds of collapsible braces 14 may be used. It will be further appreciated that the expandable medium 10 described herein may be fabricated such that the expandable medium 10 may be expanded to virtually any thickness, so long as the expandable medium 10 in the collapsed state has a thickness that allows the expandable paper to pass through a printer or copier.

Although the present invention has been shown and described with respect to various illustrated embodiments, various additions, deletions and modifications that are obvious to a person of ordinary skill in the art to which the invention pertains, even if not shown or specifically described herein, are deemed to lie within the scope of the invention as encompassed by the following claims.

What is claimed is:

1. An expandable print medium, comprising:
  a first planar sheet;
  a second planar sheet; and
  a plurality of collapsible braces comprising a first wall and a second wall, wherein a top of the first wall and a top of the second wall are attached at a flexible joint, the plurality of collapsible braces being disposed between the first planar sheet and the second planar sheet, and a bottom of the first wall is attached to the second planar sheet;

wherein the expandable print medium in a collapsed state has a thickness that allows the expandable print medium to be passed through a printer or copier;

wherein a bottom of the first wall and a bottom of the second wall contacts the second planar sheet and wherein the flexible joint contacts the first planar sheet;

wherein the plurality of collapsible braces are positioned longitudinally relative to the first planar sheet and the second planar sheet.

2. The expandable print medium of claim 1, wherein the first planar sheet comprises at least one ink-receiving layer.

3. The expandable print medium of claim 1, wherein the second planar sheet comprises at least one ink-receiving layer.

4. The expandable print medium of claim 1, wherein the plurality of collapsible braces have a general V shape.

5. The expandable print medium of claim 1, further comprising at least one filament disposed between the first planar sheet and the second planar sheet, wherein the filament is attached to the plurality of collapsible braces.

6. The expandable print medium of claim 5, further comprising a pull tab attached to at least one end of the at least one filament.

7. The expandable print medium of claim 6, wherein the pull tab further comprises an adhesive disposed on at least one surface thereof.

8. The expandable print medium of claim 1, wherein the plurality of collapsible braces are positioned transversely relative to the first planar sheet and the second planar sheet.

9. The expandable print medium of claim 1, wherein the expandable print medium is rigid and planar in an expanded state.

10. An expandable print medium, comprising:
a first planar sheet;
a second planar sheet; and
at least one collapsible brace comprising a first wall and a second wall, wherein a top of the first wall and a top of the second wall are attached at a flexible joint, the at least one collapsible brace is disposed between the first planar sheet and the second planar sheet, and a bottom of the first wall is attached to the second planar sheet;

wherein the expandable print medium in a collapsed state has a thickness that allows the expandable print medium to be passed through a printer or copier;

wherein the at least one collapsible brace in an expanded state provides strength and rigidity to the first planar sheet and the second planar sheet of the expandable print medium:

wherein the expandable print medium has a thickness of less than 0.040 inches in the collapsed state.

11. The expandable print medium of claim 10, wherein the first planar sheet comprises at least one ink-receiving layer.

12. The expandable print medium of claim 10, wherein the second planar sheet comprises at least one ink-receiving layer.

13. The expandable print medium of claim 10, wherein the at least one collapsible brace has a general V shape.

14. The expandable print medium of claim 10, wherein a bottom of the first wall and a bottom of the second wall contacts the second planar sheet and wherein the flexible joint contacts the first planar sheet.

15. The expandable print medium of claim 10, wherein the at least one collapsible brace is positioned longitudinally relative to the first planar sheet and the second planar sheet.

16. The expandable print medium of claim 10, further comprising a plurality of collapsible braces.

17. The expandable print medium of claim 10, further comprising at least one filament disposed between the first planar sheet and the second planar sheet, wherein the filament is attached to the at least one collapsible brace.

18. The expandable print medium of claim 17, further comprising a pull tab attached to at least one end of the at least one filament.

19. The expandable print medium of claim 18, wherein the pull tab further comprises an adhesive disposed on at least one surface thereof.

20. The expandable print medium of claim 10, wherein the at least one collapsible brace is positioned transversely relative to the first planar sheet and the second planar sheet.

* * * * *